(12) United States Patent
Xu et al.

(10) Patent No.: US 9,836,634 B2
(45) Date of Patent: Dec. 5, 2017

(54) ULTRAVIOLET FLUORESCENT BARCODE READING METHOD AND DEVICE

(71) Applicant: SHENZHEN MINDE ELECTRONICS TECHNOLOGY LTD., Shenzhen, Guangdong (CN)

(72) Inventors: Wenhuan Xu, Guangdong (CN); Rui Tan, Guangdong (CN); Yangqing Yi, Guangdong (CN)

(73) Assignee: SHENZHEN MINDE ELECTRONICS TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/313,106

(22) PCT Filed: May 22, 2014

(86) PCT No.: PCT/CN2014/078155
§ 371 (c)(1),
(2) Date: Nov. 22, 2016

(87) PCT Pub. No.: WO2015/176285
PCT Pub. Date: Nov. 26, 2015

(65) Prior Publication Data
US 2017/0140189 A1    May 18, 2017

(51) Int. Cl.
*G06K 7/10* (2006.01)
*G06K 7/14* (2006.01)
*G06K 7/12* (2006.01)

(52) U.S. Cl.
CPC ....... *G06K 7/1413* (2013.01); *G06K 7/10564* (2013.01); *G06K 7/12* (2013.01)

(58) Field of Classification Search
CPC ..... G06K 7/1413; G06K 7/12; G06K 7/10564
USPC ............................................ 235/462.32, 468
See application file for complete search history.

(56) References Cited

U.S. PATENT DOCUMENTS

| | | | | |
|---|---|---|---|---|
| 4,983,817 A * | 1/1991 | Dolash | ...................... | B07C 3/14 235/455 |
| 5,783,811 A * | 7/1998 | Feng | ......................... | G01J 3/51 235/462.42 |
| 2005/0023356 A1* | 2/2005 | Wiklof | ............... | G06K 7/10851 235/462.42 |
| 2007/0145136 A1* | 6/2007 | Wiklof | ............... | G06K 7/10564 235/454 |
| 2008/0252066 A1* | 10/2008 | Rapoport | ................. | B41M 1/14 283/94 |

\* cited by examiner

*Primary Examiner* — Paultep Savusdiphol

(57) ABSTRACT

An ultraviolet fluorescent barcode reading method and device, the reading method comprising the following steps: S1, irradiating an invisible ultraviolet fluorescent barcode via an ultraviolet light source and activating the invisible ultraviolet fluorescent barcode to be visible; S2, acquiring the image of the barcode activated to be visible; S3, filtering and decoding the barcode image to obtain corresponding barcode information; S4, outputting the barcode information. The reading method reads the invisible ultraviolet fluorescent barcode via a color filter, thus improving the convenience for reading.

10 Claims, 4 Drawing Sheets

ULTRAVIOLET FLUORESCENT BARCODE READING METHOD AND DEVICE

TECHNICAL FIELD

The present invention relates to the field of image processing, and more particularly, to an ultraviolet fluorescent barcode reading method and device.

BACKGROUND

The principle for ultraviolet rays irradiating fluorescent material to emit visible light is that when the ultraviolet radiation photons collide with fluorescent material atoms, the electrons are transited to a higher energy level, followed by the excited electrons returning to a lower energy level, releasing the energy in the form of low-energy photons in visible range.

Ultraviolet fluorescent ink is prepared by adding corresponding fluorescent compounds in the ink. A barcode printed with ultraviolet fluorescent ink cannot be seen (invisible) under natural light, or appears in colors that are different from those of conventional inks; while under ultraviolet rays, it shows a clear bright fluorescent patterns or unusual bright light. With different fluorescent materials, different wavelengths of ultraviolet light source and their interactions, the fluorescent patterns can appear in a variety of colors, such as red, yellow, green, blue and so on.

According to the appearance colors, the fluorescent inks can be classified as colorless, colored and color-changing fluorescent inks. A pattern printed with colorless fluorescent inks is invisible under natural light, while a clear bright fluorescent pattern with bright colors is showed under ultraviolet light. Colored fluorescent inks exhibit colors under natural light, while under ultraviolet light, the original colors shine to present fluorescent effects. Color-changing fluorescent inks show a color in natural light and another in ultraviolet light.

A barcode printed with ultraviolet fluorescent inks is advantageous in being invisible or difficult to see, which means it cannot be copied, thus it can be applied to the printing of the label, package, instruction book of bill, card, tobacco, wine, medicine, cosmetics, etc., which require high security, with a wide range of applications. Therefore, it is necessary to design a barcode reader device for reading the barcodes printed with ultraviolet fluorescent inks.

SUMMARY OF THE INVENTION

The technical problem to solve by the present invention is to provide an easy-to-use ultraviolet fluorescent barcode reading method and device.

The solution adopted by the invention is to provide a method for reading ultraviolet fluorescent barcode, comprising the following steps:
  S1, irradiating an invisible ultraviolet fluorescent barcode via an ultraviolet light source and activating the invisible ultraviolet fluorescent barcode to be visible;
  S2, acquiring the image of the barcode activated to be visible;
  S3, filtering and decoding the barcode image to obtain corresponding barcode information;
  S4, outputting the barcode information;
  wherein the step S3 comprises:
  S3.1, selecting one of a plurality of predetermined color filters to conduct filtering on the barcode image to generate a gray scale image;
  S3.2, decoding the gray scale image, and if the decoding is successful and corresponding barcode information is obtained, then executing the step S4; if not, returning to the step S3.1.

Preferably, in the step S3.2, when the decoding is successful, the color filter corresponding to the successful decoding is selected as a preferred filter, and it is preferable to filter an acquired barcode image by using the preferred filter in the next barcode reading process.

Preferably, the reading method further includes S0 before the step S1 to determine a predetermined color filter; and the step S0 includes:
  S0.1, irradiating an invisible ultraviolet fluorescent barcode for determining a predetermined color filter via an ultraviolet light source and activating the invisible ultraviolet fluorescent barcode to be visible;
  S0.2, acquiring the image of the barcode activated to be visible;
  S0.3, selecting one of a plurality of color filter according to a predetermined rule to conduct filtering on the acquired barcode image, and generating a gray scale image;
  S0.4, decoding the gray scale image to obtain corresponding barcode information, and if the decoding is successful, selecting the corresponding color filter as a predetermined color filter; if not, returning to step S0.3.

Preferably, the steps from S0.1 to S0.4 are repeated to respectively read a plurality of invisible ultraviolet fluorescent barcodes for determining a predetermined color filter to obtain a plurality of predetermined color filters.

Preferably, in the step S3.1, the color filter is selected from the group consisting of a color filter based on RGB color model, a color filter based on HSI color model, a color filter based on HSV color model, a color filter based on HSL color model, a color filter based on CMY color model, and a color filter based on CMYK color model.

The present invention provides another method for reading ultraviolet fluorescent barcode, comprising the following steps:
  S1', irradiating an invisible ultraviolet fluorescent barcode via an ultraviolet light source and activating the invisible ultraviolet fluorescent barcode to be visible;
  S2', acquiring the image of the barcode activated to be visible;
  S3', filtering the barcode image via a predetermined color filter to generate a gray scale image;
  S4', decoding the gray scale image to obtain corresponding barcode information;
  S5', outputting the barcode information;

The present invention further provides a device for reading an ultraviolet fluorescent barcode, comprising:
  an ultraviolet light source for irradiating an invisible ultraviolet fluorescent barcode and activating the invisible ultraviolet fluorescent barcode to be visible;
  an image capture unit for acquiring the image of the barcode activated to be visible;
  a filter unit for receiving the barcode image acquired by the image capture unit and filtering the barcode image via a predetermined color filter to generate a gray scale image;
  a decoder for decoding the gray scale image to obtain corresponding barcode information; and an output unit for outputting the barcode information.

Preferably, the filter unit comprises one or more color filters, and the predetermined color filter is selected from a plurality of color filters.

Preferably, the device further comprises:

a selection unit for selecting the color filter corresponding to the successful decoding as preferred filter, wherein it is preferable to filter an acquired barcode image via the preferred filter in the next barcode reading process.

Preferably, the color filter is selected from the group consisting of a color filter based on RGB color model, a color filter based on HSI color model, a color filter based on HSV color model, a color filter based on HSL color model, a color filter based on CMY color model, and a color filter based on CMYK color model.

Compared with the optical filter adopted by the traditional reading device, the present invention can improve the generality of this kind of reading, and can be applied to a plurality of kinds of invisible ultraviolet fluorescent barcodes by adopting color filters in software forms to read the invisible ultraviolet fluorescent barcodes, and is easy to use. There is no need to purchase a number of corresponding reading devices for ultraviolet fluorescent barcodes with different fluorescent colors, fluorescent bands or fluorescent materials, thereby reducing the cost of use.

BRIEF DESCRIPTION OF THE DRAWINGS

The invention will now be further described with reference to the accompanying drawings and examples, in which.

DETAILED DESCRIPTION OF THE INVENTION

Figure 1:
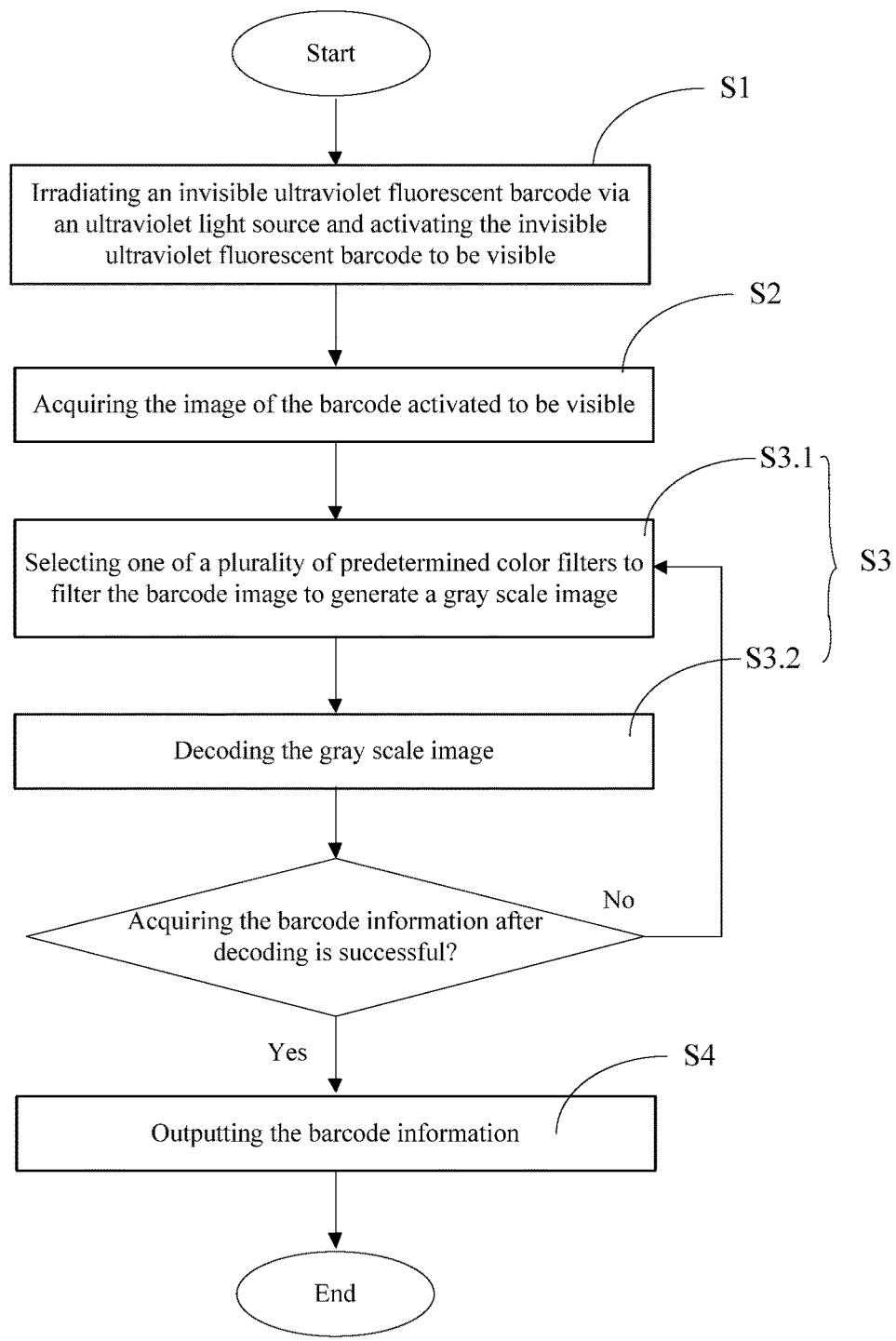
FIG. 1 is a flow chart of a method for reading an ultraviolet fluorescent barcode according to an embodiment of the present invention.

As shown in FIG. 1, a method for reading ultraviolet fluorescent barcode according to an embodiment of the present invention comprises the following steps:

S1, irradiate an invisible ultraviolet fluorescent barcode via an ultraviolet light source and activating the invisible ultraviolet fluorescent barcode to be visible.

Invisible ultraviolet fluorescent barcode is printed with ink added with visible fluorescent compounds, and by adding different components or different proportions of visible fluorescent compounds, it can be printed into barcodes with different colors of different activated states, and shows the visible state of the barcode under ultraviolet light. In this step, the ultraviolet light source is used to activate the ultraviolet fluorescent barcode to facilitate the subsequent barcode image acquisition. The barcode may be a one-dimensional code or a two-dimensional code.

S2, acquire the image of the barcode activated to be visible.

In the step S2, all the acquired barcode images are converted to digital color images based on RGB color model for subsequent filtering by predetermined color filters.

S3, filter and decode the barcode image to obtain corresponding barcode information. The barcode image in this step is a digital color image based on RGB color model.

S4, output the barcode information.

Wherein the step S3 comprises:

S3.1, select one of a plurality of predetermined color filters to conduct filtering on the barcode image to generate a gray scale image.

S3.2, conduct decoding on the gray scale image, and if the decoding is successful and corresponding barcode information is obtained, then execute the step S4; if not, return to the step S3.1. In the step S3.2, the decoding step can be divided into two steps: S3.2.1, locate the barcode modules in the gray scale image, and extract the corresponding numerical value matrix; S3.2.2, decode the numerical value matrix to obtain barcode information.

Specifically, in the step S3.1, a barcode image is subjected to a filtering process using a predetermined color filter to generate a gray scale image; the gray scale image is subjected to a decoding process in step S3.2, and if the decoding is successful, then the step S4 is executed to output the barcode information and the reading is finished. If not, the process returns to the step S3.1, and another predetermined color filter is selected to filter the barcode image to generate a gray scale image. Next, the step S3.2 is performed until the decoding is successful, and the corresponding barcode information is obtained and output. In addition, in the step S3.1, the barcode image is subjected to a filtering process by a predetermined color filter selected in accordance with a predetermined rule, such as sequentially, traversing, etc., to avoid repetitive selection of a predetermined color filter.

In the step S3, the color filter is in the form of a software filter which contains the parameter information of the desired color to be extracted. According to the invisible ultraviolet fluorescent barcode that needs to be read out, a corresponding color filter is selected as a predetermined color filter to filter the invisible ultraviolet fluorescent barcode. In some applications, when the fluorescence wavelength range of the invisible ultraviolet fluorescent barcode that needs to be read out after being activated is unknown, all the color filters will be circularly used until a successful reading is reached, in this case, there will be a large number of computations that need a long processing time, which will affect the decoding performance. Therefore, a color filter, which is frequently used, is used as a predetermined color filter by pre-setting, and the predetermined color filter is directly used for the filtering process at the time of reading, and the barcode decoding is quick in obtaining barcode information by subsequent decoding process, it is easy to use, no need for using all or most of the color filters in order to get a successful filtering, and avoid excessive time consumption by a lot of operations; by setting a number of predetermined color filters for reading a variety of invisible ultraviolet fluorescent barcodes, compared to optical filter adopted by traditional optical reading devices, it enhances the suitability for reading, and there is no need to purchase a number of corresponding reading devices for ultraviolet fluorescent barcodes with different fluorescent colors, fluorescent bands or fluorescent materials, thereby reducing the cost of use.

Furthermore, in the step S3.2, when decoding is successful, a predetermined color filter corresponding to the current successful decoding is selected as a preferred filter; in the next barcode image reading process, the preferred filter is preferentially used for filtering the acquired barcode image. In the next barcode image reading, in the step S3.1, the barcode image is subjected to a filtering process using a preferred filter to generate a gray scale image; in the step S3.2, the gray scale image is used for a decoding process, if the decoding succeeds in obtaining corresponding barcode information, the process proceeds to the step S4 and outputs the information, and if it is not successful, the process returns to the step S3.1, and the barcode image is processed by another predetermined color filter until the decoding is successful.

It will be appreciated that at the first reading, the barcode image acquired for the first time is processed and decoded by a predetermined color filter, and the predetermined color filter corresponding to the successful decoding is selected as the preferred filter. Of course, the predetermined color filter corresponding to the successful decoding may be the first filter to be processed, or it may be the second or third or even later to be processed to obtain a successfully decoded filter. In the second reading, the preferred filter is firstly used for processing and decoding the second acquired barcode image, and if the decoding is successful then obtain the corresponding barcode information; if not, then continue to use the next predetermined color filter to process and decode the barcode image until the decoding is successful, and the predetermined color filter corresponding to the second successful reading and decoding is selected as a preferred filter.

When the same batch of invisible ultraviolet fluorescent barcodes are being read, the preferred filter determined by the first reading will be used in the subsequent readings for the same batch of barcode for processing and decoding, thus no other predetermined color filters will be used for processing and it is efficient. When another batch of invisible ultraviolet fluorescent barcodes are subsequently read, another preferred filter is re-determined when the batch of barcodes is read for the first time, then process and decode, and so on.

The reading method according to the embodiment further includes S0 before the step S1 to determine a predetermined color filter; and the step S0 may include:

S0.1, irradiate an invisible ultraviolet fluorescent barcode for determining a predetermined color filter via an ultraviolet light source and activating the invisible ultraviolet fluorescent barcode to be visible. The invisible ultraviolet fluorescent barcode used to determine the predetermined color filter is a sample of the subsequent invisible ultraviolet fluorescent barcode that will be read.

S0.2, acquire the image of the barcode activated to be visible;

S0.3, select one of a plurality of color filters according to a predetermined rule to conduct filtering on the acquired barcode image, and generating a gray scale image. The rule is a sequential or traversal rule, and the color filter is selected by the predetermined rule to filter the barcode image so as to avoid the repeated selection of the color filters.

S0.4, conduct decoding on the gray scale image to obtain corresponding barcode information, and if the decoding is successful, selecting the corresponding color filter as a predetermined color filter; if not, return to step S0.3.

Step S0 may also include S0.5, output the barcode information.

Specifically, in the step S0.3, in the plurality of color filters, the acquired barcode image is sequentially filtered using a color filter to generate a gray scale image; in step S0.4, the gray scale image is decoded, and if the decoding succeeds, then the corresponding barcode information is obtained, and the step S0.5 is executed to output the barcode information, and the corresponding color filter is stored as a predetermined color filter; if the decoding is unsuccessful, then return to the step S0.3, the acquired barcode image is processed using the next color filter until the decoding is successful and the corresponding color filter is stored as a predetermined color filter.

In the aforesaid step S0, there are one or more invisible ultraviolet fluorescent barcodes for determining a predetermined filter; preferably, a plurality of invisible ultraviolet fluorescent barcodes are used to determine a number of predetermined color filters. By repeating S0.1 to S0.4, a plurality of invisible ultraviolet fluorescent barcodes for determining a predetermined color filter are read, respectively, to obtain a plurality of predetermined color filters.

The number of predetermined color filters should not be too many, since too many will cause the software to frequently operate on filtering images, causes large time consumption, thus affect the decoding performance, for example, it can be set to 20 or less, and the predetermined number of color filters can be set according to user's application. In a software filter, there may be a storage block to store a predetermined color filter. In the software filter, there may be a learning mode and a work mode. When determining a predetermined color filter, the learning mode is selected, and the operation is referred to step S0; when barcode reading is actually being performed, the work mode is selected, and it refers to the steps S1-S4 to obtain barcode information.

When a certain kind of invisible ultraviolet fluorescent barcode is read in practice, if all of the predetermined color filters fail to decode, and there is no color filter corresponding to the kind of invisible ultraviolet fluorescent barcode in the predetermined color filters, then the learning mode is re-entered, and the predetermined color filter is re-determined by the operation of the step S0.

Figure 2:
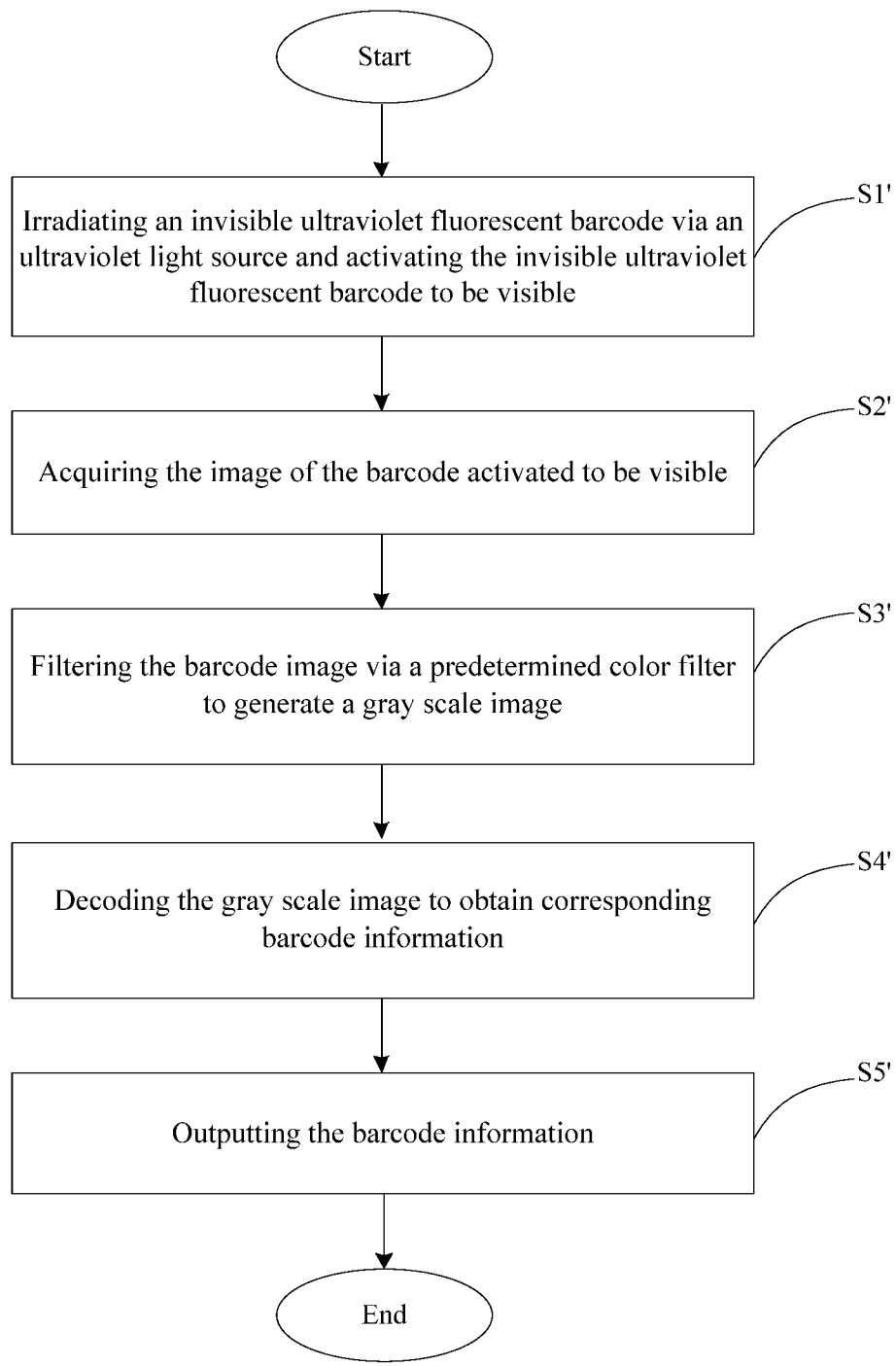
FIG. 2 is a flow chart of a method for reading an ultraviolet fluorescent barcode according to another embodiment of the present invention.

According to application, when user only need to read one color kind of invisible ultraviolet fluorescent barcodes, in order to make reading faster and more convenient, it can set only one predetermined color filter. As shown in FIG. 2, a method for reading an ultraviolet fluorescent barcode according to another embodiment of the present invention comprises the steps of:

S1', irradiate an invisible ultraviolet fluorescent barcode via an ultraviolet light source and activating the invisible ultraviolet fluorescent barcode to be visible.

S2', acquire the image of the barcode activated to be visible.

S3', conduct filtering on the barcode image via a predetermined color filter to generate a gray scale image. The predetermined color filter is obtained with reference to operation of the step S0 of the previously-described embodiment, and it is understood that the predetermined color filter may also be replaced in accordance with the change of the invisible ultraviolet fluorescent barcode.

S4', conduct decoding on the gray scale image to obtain corresponding barcode information.

S5', output the barcode information.

Furthermore, the color filter in the embodiments shown in FIGS. 1 and 2 may be a color filter based on RGB color model (hereinafter refers to as an RGB filter).

The RGB filter is presented in a form of one or a group of R, G, B color components (i.e., R, G, B values). A plurality of RGB filters respectively correspond to a plurality of narrow bands divided from the visible light whose wavelength range is from 430 nm to 790 nm. Each narrow band is represented by a specific combination of R, G, B values, which corresponds to the center wavelength, or is represented by the center wavelength and the area around it. Each of these combination of R, G, B values corresponds to a RGB filter. For example, the visible light in wavelength range between 430 nm to 790 nm is divided into a plurality of wavelength bands, wherein one of the bands has a central wavelength of 760 nm, and the corresponding R, G, B value is R226, G63, and B25, and since a RGB filter in the software represented by the same set of R, G, B values is correspond to this band, this RGB filter can be used to filter the barcode image with the fluorescent light of 760 nm central wavelength.

In general, the fluorescence wavelength of the invisible ultraviolet fluorescent barcodes after being irradiated is between 430 nm and 790 nm, and the fluorescence wavelengths of different kinds of invisible ultraviolet fluorescent barcodes are in different wavelength bands within the range between 430 nm and 790 nm. The number of bands are determined in accordance with division precision. Thus, RGB filters having different R, G, B values correspond to different bands within the range between 430 nm and 790 nm, for example, the range between 430 nm and 790 nm can be divided into 100 bands, then there are 100 RGB filters that are associated with the 100 bands. The predetermined RGB filters are selected from all of the RGB filters, and the bands corresponding to the predetermined RGB filters may be continuous or discrete. In the step S2 and step S2', the acquired barcode images are sent to the RGB filter in the form based on RGB color model for filtering, and the digital image based on RGB color model has corresponding R, G, B values and therefore has a corresponding band; in a case where the band represented by the R, G, B values in the predetermined RGB filter is consistent with the band represented by the R, G, B values of the barcode image, after the predetermined RGB filter is used to filter the barcode image, the generated gray scale image will be successfully decoded in the succeeding step, and the corresponding barcode information will be obtained.

In steps S2 and S2', the acquisition of the barcode image may be achieved by an image capture unit; the image capture unit may include, but is not limited to, a CMOS image sensor or a CCD image sensor. Different image sensors can output image data formats based on different color models, and color conversion algorithms between different color models can be integrated in the software filter.

The color filter in the embodiment shown in FIGS. 1 and 2 may be a color filter based on HSI color model (hereinafter referred to as an HSI filter). The HSI filter is presented in a form consisting of H (hue), S (saturation), I (intensity) components of one or a group of colors. In step S2, the acquired barcode image is sent to a software filter as a color image in RGB format for filtering by the HSI filter; therefore, before the filtering process by a HSI filter, it further incorporates a conversion from images based on RGB color model into images in HSI format. The conversion step can be done in the software filter or before the barcode image reaches the software filter.

Figure 3:
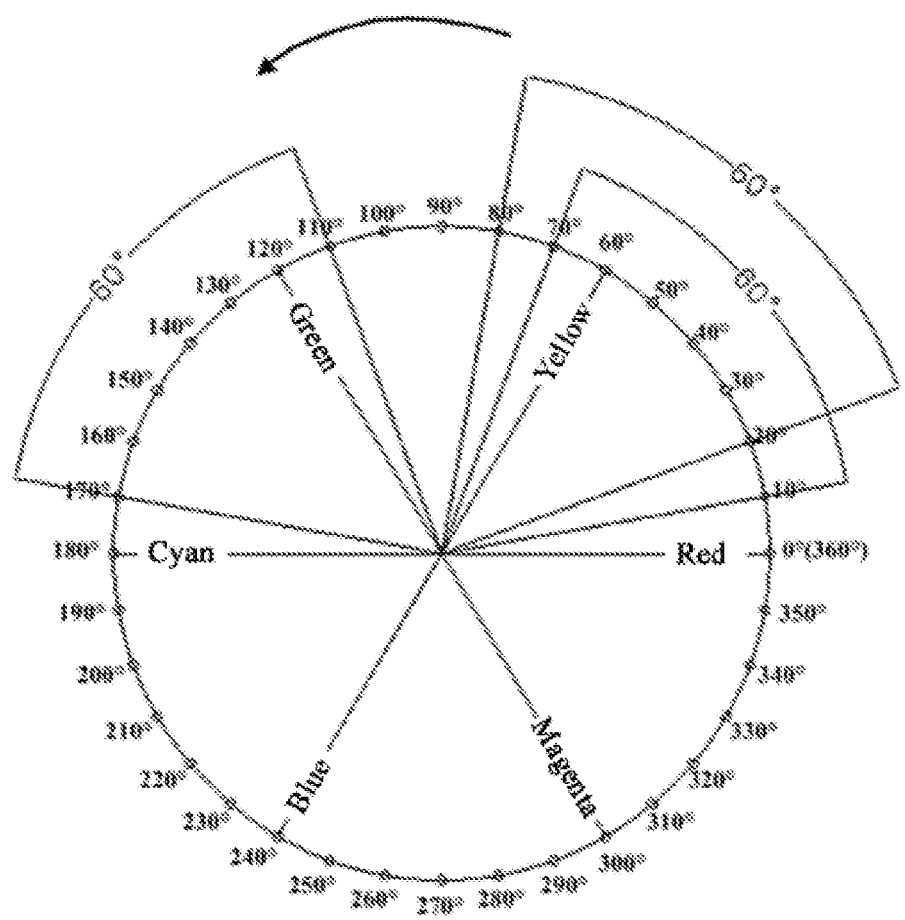
FIG. 3 is a schematic diagram of a color wheel corresponding to an HSI filter according to the present invention.

A plurality of HSI filters respectively correspond to a plurality of sectors in a color wheel, and each HSI filter corresponds to the color in one particular sector. Each sector has a corresponding angle, the number of sectors are determined according to the precision of partitioning, and the number of HSI filters corresponds to the number of sectors; and each pair of adjacent sectors may partially overlap such that the colors corresponding to the two adjacent HSI filters which corresponds to the two adjacent sectors may also partially overlap. For example, as shown in FIG. 3, the color wheel is divided by fan-shaped regions with angle of 60°, and the two adjacent sectors overlap by a small region with an angle of 10°. The color wheel can be divided into 36 sectors, wherein each sector corresponds to an HSI filter, Each HSI filter is used to filter the barcode image whose florescent color is in the corresponding sector of the filter. A plurality of sectors corresponding to a plurality of HSI filters sequentially used for the filtering process may be distributed counterclockwise or clockwise along the circle of the color wheel.

The one or more predetermined HSI filters are selected from a plurality of HSI filters, and the number of sectors corresponding to the number of predetermined HSI filters are continuous or discrete on the color wheel. When the H, S and I components of the predetermined HSI filter and those of the barcode image are consistent with each other, after the predetermined HSI filter is used to filter the barcode image, the generated gray scale image will be successfully decoded in the subsequent step, and the corresponding barcode information will be obtained.

It will be appreciated that the color filters in the aforesaid embodiments shown in FIGS. 1 and 2 may also be color filters based on HSV color model, color filters based on HSL color model, color filters based on CMY color model, or color filters based on CMYK color model. The principles of color filters based on HSV color model (H hue, S saturation, V value) and color filters based on HSL color model (H hue, S saturation, L lightness) are the same as those of the HSI color filters; The principles of color filters based on CMY color model (C cyan, M magenta, Y yellow) and color filters based on CMYK color model (C cyan, M magenta, Y yellow, K black) are the same as those of the RGB color filters.

Figure 4:
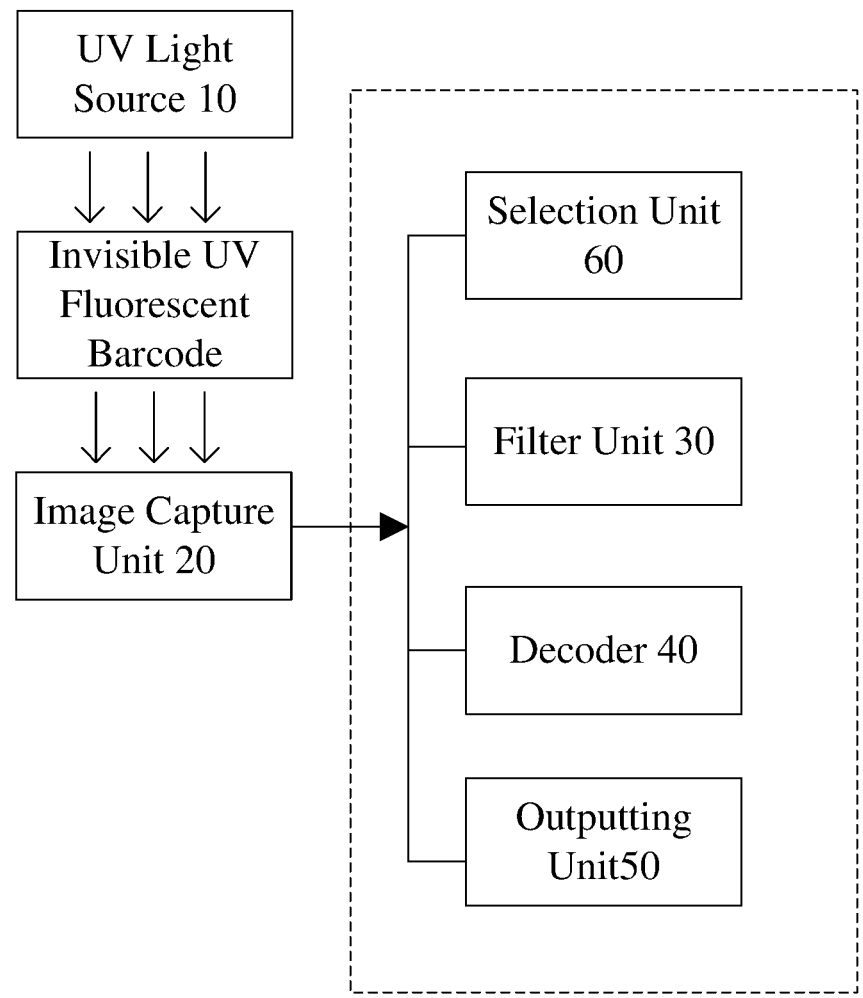
FIG. 4 is a logical diagram of a device for reading an ultraviolet fluorescent barcode according to an embodiment of the present invention.

As shown in FIG. 4, a device for reading ultraviolet fluorescent barcodes according to an embodiment of the present invention includes an ultraviolet light source 10, an image capture unit 20, a filter unit 30, a decoder 40, and an output unit 50, wherein the ultraviolet light source 10 is for irradiating an invisible ultraviolet fluorescent barcode and activating the invisible ultraviolet fluorescent barcode to be visible; the image capture unit 20 is for acquiring the image of the barcode activated to be visible; the filter unit 30 is for receiving the barcode image acquired by the image capture unit and filtering the barcode image via a predetermined color filter to generate a gray scale image; the decoder 40 is for decoding the gray scale image to obtain the corresponding barcode information; and the output unit 50 is for outputting the barcode information.

Wherein, the image capture unit 20 may include, but is not limited to, a CMOS image sensor or a CCD image sensor, wherein the CMOS image sensor is a color photosensitive chip manufactured with the CMOS (Complementary Metal Oxide Semiconductor) technology. The current common CMOS image sensor has three basic colors: R (red), G (green), B (blue). Only one color can be acquired per pixel. The general output is the Bayer (Bayer) template CFA (Color Filter Array) image, and the basic module of this template is formed as a 2×2 pixels pattern: both pixels of one diagonal are green; one pixel of the other diagonal is red, and the other pixel is blue. When the color component of the image is processed, the R, G, and B components of each pixel are calculated from the color components of the surrounding pixels of each pixel. The image capture unit 20 converts the acquired barcode images into digital color images based on RGB color model, and sends them to the filtering unit for processing. Therefore, the barcode image used for the filtering process is actually a digital color image based on RGB color model.

Wherein, the filtering unit 30 comprises one or more color filters; a predetermined color filter is selected from a plurality of color filters. There are one or more predetermined color filters, which are determined in a manner mainly based on the invisible ultraviolet fluorescent barcodes which need to be read to choose corresponding color filters. The number of predetermined color filters can be determined according to the application needs; the number should not be too many, since too many filters will result in more time-costing operations, thus it will affect the decoding performance, and the number, for example, can be 20 or less.

The filtering unit 30 is a software filter. The color filter may be a color filter selected from a group consisting of a color filter based on RGB color model, a color filter based on HSI color model, a color filter based on HSV color model, a color filter based on HSL color model, a color filter based on CMY color model, or a color filter based on CMYK color model. The color filter based on RGB color model (hereinafter referred to as RGB filter) is presented in the form of one or a group of R, G, B values; a plurality of RGB filters respectively correspond to a plurality of narrow bands divided from the visible light whose wavelength range is from 430 nm to 790 nm. Each narrow band is represented by a specific combination of R, G, B values, which corresponds to the center wavelength, or is represented by the center wavelength and the area around it. Each of these combination of R, G, B values corresponds to an RGB filter. The color filter based on HSI color model (hereinafter referred to as HSI filter) is presented in a form of H (hue), S (saturation), I (intensity) components of one or a group of colors; a plurality of HSI filters respectively correspond to a plurality of sectors on a color wheel, and each HSI filter corresponds to the color in a particular sector. Each sector has a corresponding angle, the number of sectors is determined according to the precision of partitioning, and the number of HSI filters corresponds to the number of sectors; the principles of color filters based on HSV color model and color filters based on HSL color model are the same as those of the HSI color filters; The principles of color filters based on CMY color model and color filters based on CMYK color model are the same as those of the RGB color filters. The RGB filters and the HSI filters have already been described in the previously-mentioned reading method, and will not be described again here.

Corresponding to an HSI filter, HSV filter or HSL filter, the reading device may further include a conversion module for converting the digital color image based on RGB color model into a digital color image based on HSI color model, HSV color model, or HSL color model; the conversion module may be integrated in the filtering unit 30 or independent of the filtering unit 30.

The decoder 40 may include an image processing unit for locating the basic modules of a barcode in the gray scale image and extracting a corresponding matrix, and a decoding unit for performing a decoding process on the extracted matrix to obtain the barcode information.

Furthermore, the reading device further comprises a selecting unit 60 for selecting a predetermined color filter corresponding to successful decoding as a preferred filter, wherein a preferred filter is preferentially used in the next barcode reading process for the filtering operation on the acquired barcode image. The filter unit 30, the decoder 40, the output unit 50, and the selection unit 60 may each be a program executed on a microcontroller (MCU), or a digital signal processor (DSP).

Preferably, the filter may be fixed or dynamic. For example, when the selecting unit 60 selects a predetermined color filter corresponding to the successful decoding after the first reading as a preferred filter, the preferred filter remains unchanged if the barcode image processed by it at the second reading can still be successfully decoded. If the barcode image processed by the preferred filter is unsuccessfully decoded at the second reading but successfully decoded after processed by another predetermined color filter, the selection unit 60 will re-select the latest successfully-decoded predetermined color filter as a new preferred filter. When reading the invisible ultraviolet fluorescent barcodes, it is highly efficient to directly call a predetermined color filter for filtering. After the first reading and decoding, the predetermined color filter corresponding to the processing is selected by the selecting unit 60 as a preferred filter so that it is the first predetermined color filter to perform filtering processing on the barcode image in the next reading.

From the above we can see that the reading device can read a lot of invisible ultraviolet fluorescent barcodes through software color filters, which improve the applicability and reduce the cost compared with the optical filter adopted by the traditional reading devices.

The foregoing is intended only as a preferred embodiment of the present invention and is not intended to limit the present invention, and changes, combinations and variations of the invention may occur to those skilled in the art. Any modifications, equivalent substitutions and improvements within the spirit and principles of the present invention are considered to be included in the scope of the claims of the present invention.

The invention claimed is:

1. A method for reading an ultraviolet fluorescent barcode, characterized in that the method comprises the following steps:
   S1, irradiating an invisible ultraviolet fluorescent barcode via an ultraviolet light source and activating the invisible ultraviolet fluorescent barcode to be visible;
   S2, acquiring the image of the barcode activated to be visible;
   S3, filtering and decoding the barcode image to obtain corresponding barcode information;
   S4, outputting the barcode information;
   wherein the step S3 comprises:
   S3.1, selecting one of a plurality of predetermined color filters to conduct filtering on the barcode image to generate a gray scale image;
   S3.2, decoding the gray scale image, and if the decoding is successful and corresponding barcode information is obtained, then executing the step S4; if not, returning to the step S3.1.

2. The method for reading an ultraviolet fluorescent barcode according to claim 1, characterized in that, in the step S3.2, when the decoding is successful, the color filter corresponding to the successful decoding is selected as a preferred filter, and it is preferable to filter an acquired barcode image by using the preferred filter in the next barcode reading process.

3. The method for reading an ultraviolet fluorescent barcode according to claim 1, characterized in that, the method further includes S0 before the step S1 to determine a predetermined color filter; and the step S0 includes:
   S0.1, irradiating an invisible ultraviolet fluorescent barcode for determining a predetermined color filter via an ultraviolet light source and activating the invisible ultraviolet fluorescent barcode to be visible;
   S0.2, acquiring the image of the barcode activated to be visible;

S0.3, selecting one of a plurality of color filters according to a predetermined rule to conduct filtering on the acquired barcode image, and generating a gray scale image;

S0.4, decoding the gray scale image to obtain corresponding barcode information, and if the decoding is successful, selecting the corresponding color filter as a predetermined color filter; if not, returning to step S0.3.

4. The method for reading an ultraviolet fluorescent barcode according to claim 3, characterized in that the steps from S0.1 to S0.4 are repeated to respectively read a plurality of invisible ultraviolet fluorescent barcodes for determining a predetermined color filter to obtain a plurality of predetermined color filters.

5. The method for reading an ultraviolet fluorescent barcode according to claim 1, characterized in that in the step S3.1, the color filter is selected from the group consisting of a color filter based on RGB color model, a color filter based on HSI color model, a color filter based on HSV color model, a color filter based on HSL color model, a color filter based on CMY color model, and a color filter based on CMYK color model.

6. A method for reading an ultraviolet fluorescent barcode, characterized in that the reading method comprises the following steps:

S1', irradiating an invisible ultraviolet fluorescent barcode via an ultraviolet light source and activating the invisible ultraviolet fluorescent barcode to be visible;

S2', acquiring the image of the barcode activated to be visible;

S3', filtering the barcode image via a predetermined color filter to generate a gray scale image;

S4', decoding the gray scale image to obtain corresponding barcode information;

S5', outputting the barcode information.

7. A device for reading an ultraviolet fluorescent barcode, characterized in that the device comprises:

an ultraviolet light source for irradiating an invisible ultraviolet fluorescent barcode and activating the invisible ultraviolet fluorescent barcode to be visible;

an image capture unit for acquiring the image of the barcode activated to be visible;

a color filter unit for receiving the barcode image acquired by the image capture unit and filtering the barcode image via a predetermined color filter to generate a gray scale image;

a decoder for decoding the gray scale image to obtain corresponding barcode information; and an output unit for outputting the barcode information.

8. The device for reading an ultraviolet fluorescent barcode according to claim 7, characterized in that the filter unit comprises one or more color filters, and the predetermined color filter is selected from a plurality of color filters.

9. The device for reading an ultraviolet fluorescent barcode according to claim 7, characterized in that the device further comprises:

a selection unit for selecting the color filter corresponding to the successful decoding as preferred filter, wherein it is preferable to filter an acquired barcode image via the preferred filter in the next barcode reading process.

10. The device for reading an ultraviolet fluorescent barcode according to claim 7, characterized in that the color filter is selected from the group consisting of a color filter based on RGB color model, a color filter based on HSI color model, a color filter based on HSV color model, a color filter based on HSL color model, a color filter based on CMY color model, and a color filter based on CMYK color model.

* * * * *